No. 771,184. Patented September 27, 1904.

UNITED STATES PATENT OFFICE.

PAUL STEENBOCK, OF DEUTSCH WILMERSDORF, GERMANY.

PROCESS OF MANUFACTURING VITREOUS CEMENT.

SPECIFICATION forming part of Letters Patent No. 771,184, dated September 27, 1904.

Application filed June 22, 1904. Serial No. 213,723. (No specimens.)

*To all whom it may concern:*

Be it known that I, PAUL STEENBOCK, a subject of the King of Prussia, Emperor of Germany, residing at 135 Uhlandstrasse, Deutsch Wilmersdorf, near Berlin, in the Kingdom of Prussia and Empire of Germany, have invented a new and useful Process of Manufacturing Vitreous Cement, of which the following is a specification.

My invention relates to a process of manufacturing vitreous cement, which substantially consists in mixing phosphoric acids or their acid salts in solution with beryllium compounds decomposable by or reacting with the same. The product thus obtained, which possesses excellent cementing qualities and is particularly suitable for plugging teeth, exhibits an extremely high transparency, this being quite a new feature with cements produced by the cold method. Translucent cements have already been obtained by a melting process; but this process is too inconvenient and difficult to be employed—for instance, in the case of pluggings for teeth—besides being very expensive and frequently attended by failure.

The material produced by my aforesaid process in a convenient manner is quite vitreous, slightly opalescent, and has an exceedingly delicate bluish-white tint, by reason of which it is especially adapted to be used for plugging delicately-translucent teeth, as a cement for pearls, fine porcelain, and the like. In addition to the aforesaid high transparency, which is a new property in cements of the kind, and the deep luster due to such property the cement manufactured by my process constitutes a new chemical compound differing materially from all cements of a cognate character. In contradistinction to the other cements, which are formed chiefly of zinc, calcium, and magnesium phosphates, this cement consists almost exclusively of pure beryllium compounds.

I am aware that cements are used to the acids of which beryllium oxid has been added; but this addition is only designed for delaying the hardening and may in this function be replaced by magnesium oxid. It has no determining influence upon the composition of the hardened cement, which does not differ from that of other cements. The quantity added is so slight that the cement produced does not by any means consist of beryllium compounds, such as is the case with the cement made by my process.

A convenient mode of carrying this process into effect is as follows: A deposit formed by precipitating a solution of basic beryllium nitrate, $Be(NO_3)_2.2BeO$, with sodium silicate, $(Na_2SiO_3,)$ after it has remained for some length of time under water is filtered, carefully washed, dried, and slightly calcined. The preparation obtained, the empiric formula of which is $3BeOSiO_2$, is finely ground and used by itself or, if greater consistence be required, is intimately mixed with glass or pure clay. The powder is carefully triturated with an approximately fifty-two-per-cent. orthophosphoric acid in which aluminium phosphate containing a little zinc phosphate or strontium phosphate is dissolved almost to saturation. In this manner a plastic material is obtained which in a short time sets to form a cement exhibiting the properties hereinbefore set forth. It is supposed that in the hardening the acid liquid withdraws beryllium oxid from the basic beryllium silicate, leaving a hydrated silicate behind and forming phosphate.

What I claim as my invention, and desire to secure by Letters Patent, is—

1. A process of manufacturing vitreous cement, consisting in mixing phosphoric acids with a beryllium compound susceptible of being chemically changed by the same, substantially as herein described.

2. A process of manufacturing vitreous cement, consisting in mixing acid salts of phosphoric acids in solution with a beryllium compound susceptible of being chemically changed by the same, substantially as herein described.

3. A process of manufacturing vitreous cement, consisting in precipitating a solution of basic beryllium nitrate with sodium silicate, and triturating the deposit with orthophosphoric acid containing aluminium phosphate with addition of zinc phosphate, substantially as herein set forth.

4. As an article of manufacture, vitreous cement comprising a beryllium compound, substantially as herein set forth.

In testimony whereof I have signed my name to this specification in the presence of two subscribing witnesses.

PAUL STEENBOCK.

Witnesses:
 HENRY HASPER,
 WOLDEMAR HAUPT.